July 14, 1931.  J. W. HEETER  1,814,800
WELL APPLIANCE
Filed May 16, 1928
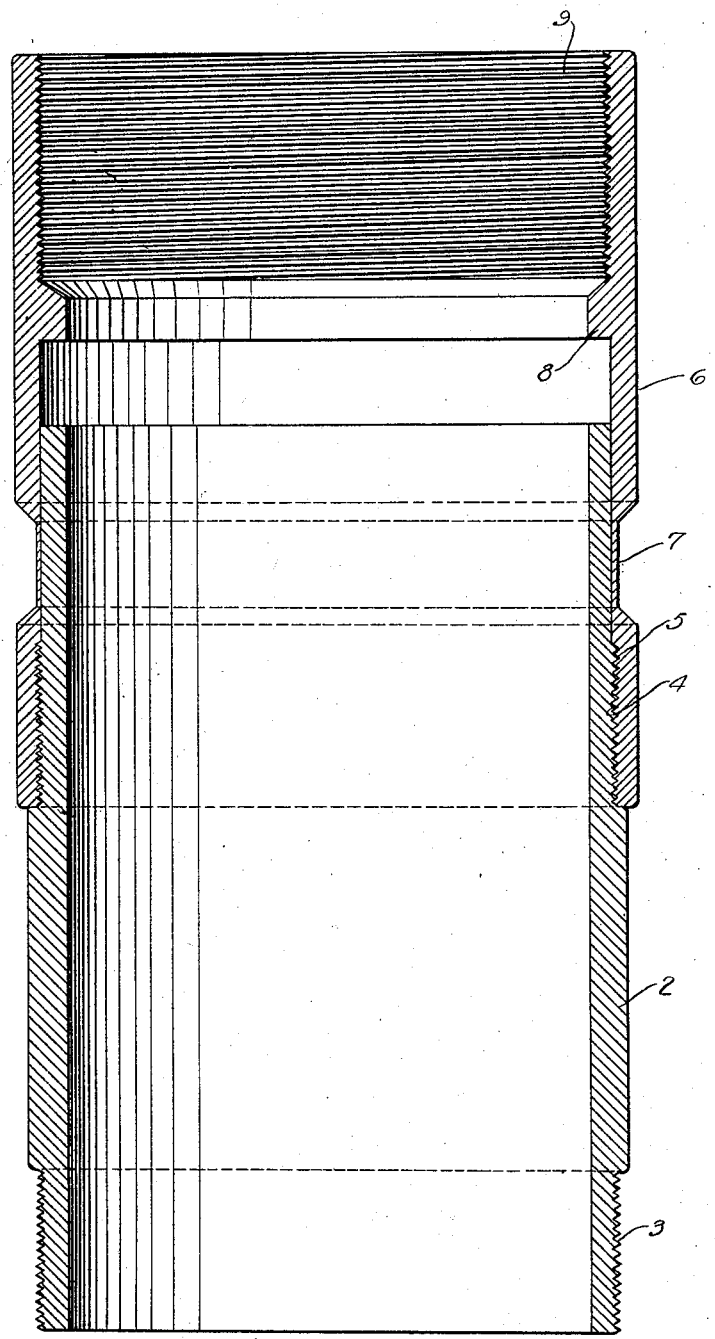
INVENTOR

UNITED STATES PATENT OFFICE

JOSEPH W. HEETER, OF BUTLER, PENNSYLVANIA

WELL APPLIANCE

Application filed May 16, 1928. Serial No. 278,259.

This invention relates broadly to well appliances and more particularly to a device adapted for use in a well casing in order to facilitate the removal of a portion of the casing from the well. It relates still more particularly to such an appliance having a frangible portion adapted to be severed to separate a well casing into two distinct portions, while at the same time preserving the seal of the well. It relates still more particularly to such an appliance having a circumferentially continuous frangible portion adapted to be severed upon the application of an axial force.

This invention is in the nature of an improvement over that of the patent to Charles M. Heeter, No. 754,138, granted March 8, 1904. In wells of any considerable depth the lower portion of the casing is subjected to very great pressures and becomes so tightly embedded, and often so greatly deformed by the pressures exerted thereagainst, as to render it almost impossible of removal. When the casing is formed integrally from top to bottom and it is attempted to remove the entire casing by exerting an upward pull at or near its top, it is quite often impossible to move the casing upward on account of the extreme tightness with which the lower portion is embedded in the ground. At times the casing may be ruptured or badly damaged in an effort to pull it out of the well, due to the facts above mentioned.

In the patent to Charles M. Heeter above mentioned, an attempt was made to provide a frangible well appliance adapted to form a part of a well casing and to be severed upon the application of an axial force, whereby the casing is effectively divided into two separate portions, the upper of which is adapted to be removed from the well while the lower, which is usually so tightly embedded as to be practically impossible to remove, is abandoned and remains in the ground. In such patent use was made of rivets passing through the respective portions of the well appliance and adapted to be sheared when a sufficient weight of casing was lowered into the well above the appliance. The use of rivets was found however to have the disadvantage that the rivets were often prematurely sheared, thus severing the casing and making it impossible to move the casing vertically upward during positioning thereof and working of the well without losing its seal.

I provide an appliance adapted to be used in a well casing whereby the casing above the lower portion referred to, may be severed from the lower portion and pulled out of the well, while at the same time maintaining sufficient strength at the connection between the two portions of casing to prevent premature severing thereof. The appliance embodies a frangible portion which is adapted to be severed when the casing is in place but which will not unseal the well.

In operation, as much of the casing as experience has shown will stick in the bottom of the well is first inserted into the hole and then my appliance is secured to the top of such portion. Another section of casing is secured to the top of the appliance so that in effect the casing, as it is sunk into the hole, is integral but with my appliance disposed intermediate its top and bottom. Sinking of the casing continues until a sufficient weight of casing has been inserted above the appliance to sever it at the frangible portion, whereupon the casing becomes in effect two distinct pieces, but so fitted together as to preserve the seal.

At such time as it is desired to remove the casing from the well, the upper portion of casing is raised and due to the severance effected by my appliance the lower portion, which as above mentioned is so tightly wedged in the hole as to be practically impossible to remove, is left at the bottom of the hole. This greatly facilitates removal of the portion of the casing which is susceptible of removal without injury to it and without interference by the lower portion of the casing.

In the accompanying drawing I have shown a present preferred embodiment of the invention. The figure of the drawing shows in cross section my well appliance.

Referring more particularly to the drawing, reference numeral 2 designates a tubular member of considerable strength, which may be formed of high carbon steel, and which is provided at its lower end with screw threads 3. These threads are adapted to be screwed into a casing collar so as to secure my appliance at the top of a section of casing which is being sunk into a hole. The tubular member 2 is provided intermediate its ends with screw threads 4 adapted to engage threads 5 of a second tubular member 6 which fits around the upper end of the member 2.

The member 6 is preferably of a material somewhat weaker than that of the member 2 and is provided with a thin circumferentially continuous portion 7 which lies along and is braced or guided by the upper portion of the member 2. The member 6 is also provided with an annular inward projection 8 which may comprise a lead packing, and with screw threads 9 at its upper extremity to which a casing collar is adapted to be secured in order to fasten a length of casing to my appliance and above it. Thus my appliance in effect forms an integral part of a casing and is disposed intermediate the top and bottom thereof.

As the casing is lowered into the well, a sufficient downward force will be brought to bear upon the member 6 that its frangible portion 7 will be caused to bend outwardly away from the member 2 and consequently be severed. Upon severance of the portion 7, the packing 8 finds a seat on the top of the member 2, thereby maintaining the seal of the casing. The members 6 and 2 fit snugly together so that as long as no upward force is imparted to the upper portion of the casing, the casing as a whole will remain intact.

When it is desired to remove the casing, an upward force is applied to the upper section thereof, which will be easily pulled out due to severance of the member 7, the lower portion of the casing and the member 2 remaining at the bottom of the hole.

The provision of a circumferentially continuous frangible portion lends to the appliance a considerable strength which is desirable during sinking and adjustment of the casing, while at the same time making it possible, by the application of a sufficient axial force, to sever the frangible portion and thus separate the casing.

While I have shown and described a present preferred embodiment of the invention, it is to be understood that the same is not limited thereto but may be otherwise embodied within the scope of the following claim:

I claim:

The combination of an inner tubular member having an externally screw-threaded portion near to but spaced from one of its free ends, the portion immediately adjacent said free end having a smooth and substantially cylindrical periphery, and an outer tubular member having an internally screw-threaded portion immediately adjacent one of its free ends adapted to engage the first-mentioned screw-threads, said outer member having a weakened portion in the rear of its screw-threaded portion and so proportioned that said weakened portion will surround and engage the smooth and substantially cylindrical portion of said first-mentioned member.

In testimony whereof I have hereunto set my hand.

JOSEPH W. HEETER.